United States Patent
Kim

(10) Patent No.: US 12,282,389 B2
(45) Date of Patent: Apr. 22, 2025

(54) ERROR CORRECTION DECODER, STORAGE DEVICE INCLUDING ERROR CORRECTION DECODER, AND OPERATING METHOD THEREOF

(71) Applicant: SK hynix Inc., Gyeonggi-do (KR)

(72) Inventor: Dae Sung Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/498,047

(22) Filed: Oct. 31, 2023

(65) Prior Publication Data

US 2024/0296093 A1 Sep. 5, 2024

(30) Foreign Application Priority Data

Mar. 3, 2023 (KR) ........................ 10-2023-0028577

(51) Int. Cl.
*G06F 11/10* (2006.01)
*G06F 11/07* (2006.01)

(52) U.S. Cl.
CPC ........ *G06F 11/1068* (2013.01); *G06F 11/076* (2013.01); *G06F 11/1048* (2013.01)

(58) Field of Classification Search
CPC . G06F 11/1068; G06F 11/076; G06F 11/1048
See application file for complete search history.

(56) References Cited

U.S. PATENT DOCUMENTS

| | | | |
|---|---|---|---|
| 11,996,865 B2* | 5/2024 | Cho | G06F 3/0659 |
| 2013/0266097 A1* | 10/2013 | Chen | H03M 13/2975 |
| | | | 375/340 |
| 2017/0222659 A1* | 8/2017 | Weng | H03M 13/1128 |
| 2018/0343082 A1 | 11/2018 | Xiong et al. | |
| 2021/0359710 A1* | 11/2021 | Jo | G06F 1/04 |
| 2022/0094470 A1* | 3/2022 | Torbatian | H04L 1/0051 |
| 2023/0231579 A1* | 7/2023 | Cho | G06F 3/064 |
| | | | 714/764 |
| 2024/0193040 A1* | 6/2024 | Gim | G06F 11/1048 |

FOREIGN PATENT DOCUMENTS

KR 10-2019-0019716 A 2/2019
WO WO-2018233462 A1 * 12/2018

* cited by examiner

*Primary Examiner* — Guy J Lamarre
(74) *Attorney, Agent, or Firm* — IP & T GROUP LLP

(57) ABSTRACT

A storage device may include a memory device and a memory controller. The memory device may store data. The memory controller may iterate error correction decoding on data read from the memory device, determine whether to continue iterating based on a result obtained by comparing a first threshold number with a number of Unsatisfied Check Nodes (UCNs) included in a syndrome of first decoded data, which is a result of a first set number of iterations of the error correction decoding on the read data, and determine whether to continue iterating based on a result obtained by comparing a second threshold number with a number of UCNs included in a syndrome of second decoded data, which is a result of a sum of the first set number and a second set number of iterations of the error correction decoding on the read data.

13 Claims, 12 Drawing Sheets

FIG. 3

$$\begin{bmatrix} 1 & 0 & 1 & 0 & 1 & 0 & 0 \\ 0 & 1 & 0 & 1 & 0 & 1 & 0 \\ 1 & 0 & 0 & 1 & 0 & 0 & 1 \end{bmatrix} \times \begin{bmatrix} R_{i1} \\ R_{i2} \\ R_{i3} \\ \vdots \\ R_{i7} \end{bmatrix} = \begin{bmatrix} S_{i1} \\ S_{i2} \\ S_{i3} \end{bmatrix}$$

H            $R_i^T$          $S_i$

H = Parity Check Matrix
Ri = Read Data
Si = Syndrome

FIG. 6

|  | Decoding Result | Operation Time | Utility |
|---|---|---|---|
| S503 | S1 | $(x_1 + I_{avg}) \times t_I + t_R + t_{Dout}$ | X |
|  | F1 | $(x_1 + I_{avg}) \times t_I + t_R + t_{Dout}$ | O |
| S507 | S2 | $(x_1 + x_2 + I_{avg}) \times t_I + t_R + t_{Dout}$ | X |
|  | F2 | $(x_1 + x_2 + I_{avg}) \times t_I + t_R + t_{Dout}$ | O |
| S509 | S3 | $I_{avg} \times t_I$ | – |
|  | F3 | $(I_{max} + I_{avg}) \times t_I + t_R + t_{Dout}$ | – |

$t_I$ : Decoder operation time for 1 iteration
$t_R$ : Read time for ECC chunk in NAND
$t_{Dout}$ : Transfer time for ECC chunk from NAND
$I_{avg}$ : Average iteration for decoding
$I_{max}$ : Maximum iteration for decoding

FIG. 7

*Decoding Parameter* $X = (x1, x2, Th1, Th2)$
$c_i = i$ – th Error Environment Data
$T_{c_i}^G(X)$ = Throughput Gain (Early Termination/Non Early Termination)

· Optimization1: $X_{opt_1} = \underset{X}{\arg\min} \sum_{c_i} \left( \underset{X_{c_i}}{\max} \left( T_{c_i}^G(X_{c_i}) \right) - T_{c_i}^G(X) \right)$
  · Parameter which minimize the sum of gaps from the local maximums · Optimization2: $X_{opt_2} = \underset{X}{\arg\max} \sum_{c_i} T_{c_i}^G(X)$
  · Parameter which maximize the sum of throughputs

FIG. 8

| # of DTVO | Set Number of times (=x) | Threshold Number (=Th) |
|---|---|---|
| 1 | $x_1$ | $Th_1$ |
| 2 | $x_2$ | $Th_2$ |
| ⋮ | ⋮ | ⋮ |
| n | $x_n$ | $Th_n$ |

ERROR CORRECTION DECODER, STORAGE DEVICE INCLUDING ERROR CORRECTION DECODER, AND OPERATING METHOD THEREOF

CROSS-REFERENCE TO RELATED APPLICATION

The present application claims priority under 35 U.S.C. § 119 (a) to Korean patent application number 10-2023-0028577 filed on Mar. 3, 2023, the entire disclosure of which is incorporated by reference herein.

BACKGROUND

1. Field of Invention

Embodiments of the present disclosure generally relate to an error correction decoder performing error correction, a storage device including an error correction decoder, and an operating method thereof.

2. Description of Related Art

A storage device may include a storage medium for temporarily or permanently storing data. During various operations such as write, read, transmission, and processing, a data error or data corruption may occur.

In order to ensure data reliability, the storage device may use error correction techniques such as error correction encoding and error correction decoding.

SUMMARY

Embodiments of the present disclosure provide an error correction decoder performing error correction, a storage device including an error correction decoder, and an operating method thereof.

In accordance with an aspect of the present disclosure, there is provided a storage device including: a memory device configured to store data; and a memory controller configured to iterate error correction decoding on data read from the memory device, determine whether to continue iterating based on a result obtained by comparing a first threshold number with a number of Unsatisfied Check Nodes (UCNs) included in a syndrome of first decoded data, which is a result of a first set number of iterations of the error correction decoding on the read data, and determine whether to continue iterating based on a result obtained by comparing a second threshold number with a number of UCNs included in a syndrome of second decoded data, which is a result of a sum of the first set number and a second set number of iterations of the error correction decoding on the read data.

In accordance with another aspect of the present disclosure, there is provided an error correction decoder including: a decoding processor configured to generate first decoded data by iterating error correction decoding on read data by a first set number, and generate second decoded data by additionally iterating the error correction decoding on the first decoded data by a second set number; and a decoding controller configured to determine whether to continue iterating based on at least one of first and second results, wherein the first result is obtained by comparing a first threshold number with a number of Unsatisfied Check Nodes (UCNs) included in a syndrome of the first decoded data. The second result is obtained by comparing a second threshold number with a number of UCNs included in a syndrome of the second decoded data.

In accordance with still another aspect of the present disclosure, there is provided an error correction decoder including: a decoding processor configured to perform a first operation of generating decoded data by iterating error correction decoding on read data by a set number; and a decoding controller configured to perform a second operation of determining whether to terminate the iterating of the error correction decoding based on a result obtained by comparing a threshold number with a number of Unsatisfied Check Nodes (UCNs) included in a syndrome of the decoded data. The decoding processor and the decoding controller iterate a set of the first and second operations, as a decoding termination verification operation, at least twice. Each of the set number and the threshold number is set according to a number of iterations of the decoding termination verification operation.

In accordance with still another aspect of the present disclosure, there is provided a method of operating an error correction decoder, the method including: generating first decoded data by iterating error correction decoding on read data by a first set number; determining whether to terminate the iterating based on a result obtained by comparing a first threshold number with a number of Unsatisfied Check Nodes (UCNs) included in a syndrome of the first decoded data; generating second decoded data by additionally iterating the error correction decoding on the first decoded data by a second set number when determining not to terminate the iterating; and determining whether to terminate the iterating based on a result obtained by comparing a second threshold number with a number of UCNs included in a syndrome of the second decoded data.

In accordance with still another aspect of the present disclosure, there is provided a method of operating an error correction decoder, the method including: setting each of a set number and a threshold number according to a number of iterations of a decoding termination verification operation; and iterating, as the decoding termination verification operation, a set of first and second operations at least twice until error correction decoding on read data is terminated. The first operation is an operation of generating decoded data by iterating the error correction decoding on the read data by the set number. The second operation is an operation of determining whether to terminate the iterating of the error correction decoding based on a result obtained by comparing the threshold number with a number of Unsatisfied Check Nodes (UCNs) included in a syndrome of the decoded data.

In accordance with still another aspect of the present disclosure, there is provided an error correction decoder including: a decoding processor configured to iterate error correction decoding on read data; and a decoding controller configured to compare a threshold number with a number of Unsatisfied Check Nodes (UCNs) included in a syndrome of decoded data, which is a result of a preset number of iterations of the error correction decoding on the read data, and determine whether to continue iterating based on a result of the comparing.

BRIEF DESCRIPTION OF THE DRAWINGS

Example embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 3 is a diagram illustrating a syndrome in error correction decoding.

FIG. 6 is a diagram illustrating a time required according to a success/fail case of error correction decoding in FIG. 5A.

FIG. 7 is a diagram illustrating an expression for determining an optimization parameter in accordance with an embodiment of the present disclosure.

FIG. 8 is a diagram illustrating a parameter table in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
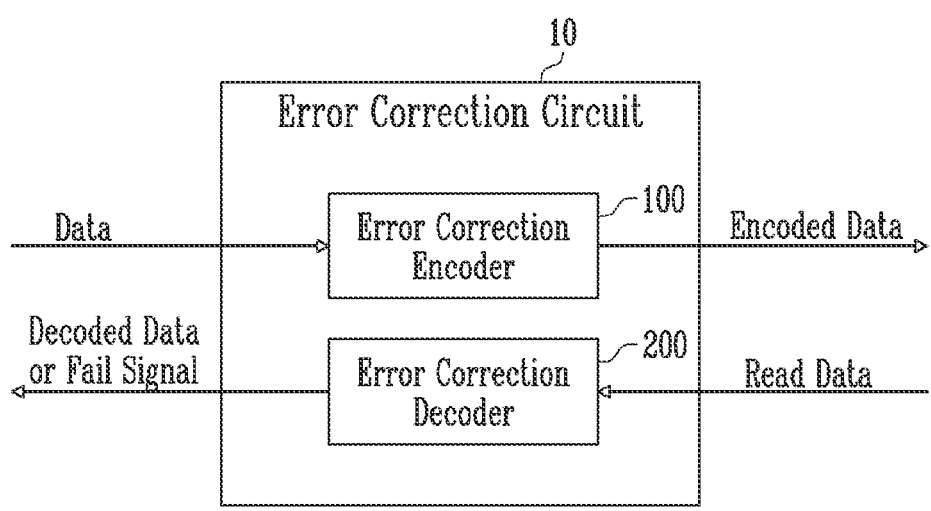
FIG. 1 is a diagram illustrating an error correction circuit.

FIG. 1 is a diagram illustrating an error correction circuit 10.

Referring to FIG. 1, the error correction circuit 10 may include an error correction encoder 100 and an error correction decoder 200.

The error correction encoder 100 may receive data from the outside, and perform error correction encoding by using the data and a generator matrix of an error correction code. The error correction encoder 100 may perform the error correction encoding by using the data and a parity check matrix of the error correction code.

The error correction encoder 100 may output encoded data as a result obtained by performing the error correction encoding. The encoded data may be a codeword. The codeword may be stored in a memory device. The error correction encoder 100 may use a Low Density Parity Check (LDPC) code as the error correction code. The type of the error correction code is not limited to this embodiment.

The error correction decoder 200 may receive read data from the outside. The read data may be data obtained by reading encoded data stored in the memory device. The error correction decoder 200 may perform error correction decoding by using the read data and a parity check matrix.

The error correction decoder 200 may perform the error correction decoding by using various algorithms employing an iterative decoding scheme. For example, the algorithms may include a bit flipping algorithm, a sum-product algorithm, a min-sum algorithm, a scaled min-sum algorithm, and the like. The types of algorithms are not limited to this embodiment.

The error correction decoder 200 may perform at least one-time iteration within a set maximum iteration number Imax. When a valid codeword satisfying constraints of a parity check matrix of an error correction code within the maximum iteration number Imax is generated, the error correction decoder 200 may output the generated valid codeword as decoded data. When the valid codeword satisfying the constraints of the parity check matrix of the error correction code within the maximum iteration number Imax is not generated, the error correction decoder 200 may output a fail signal representing that the error correction decoding has failed.

For example, the error correction decoder 200 may use an LDPC code as the error correction code. The type of the error correction code is not limited to this embodiment. The error correction decoding using the LDPC code may be error correction decoding in which a syndrome weight is in proportion to an error bit number remaining in an ECC chunk. The syndrome weight may be a number of Unsatisfied Check Nodes (UCNs) as nodes which are not '0' among entries. A case where bit values estimated as errors in the ECC chunk are reversed is iterated in the error correction decoding using the LDPC code. Accordingly, the syndrome weight is also changed, and its value is continuously traced.

Figure 2:
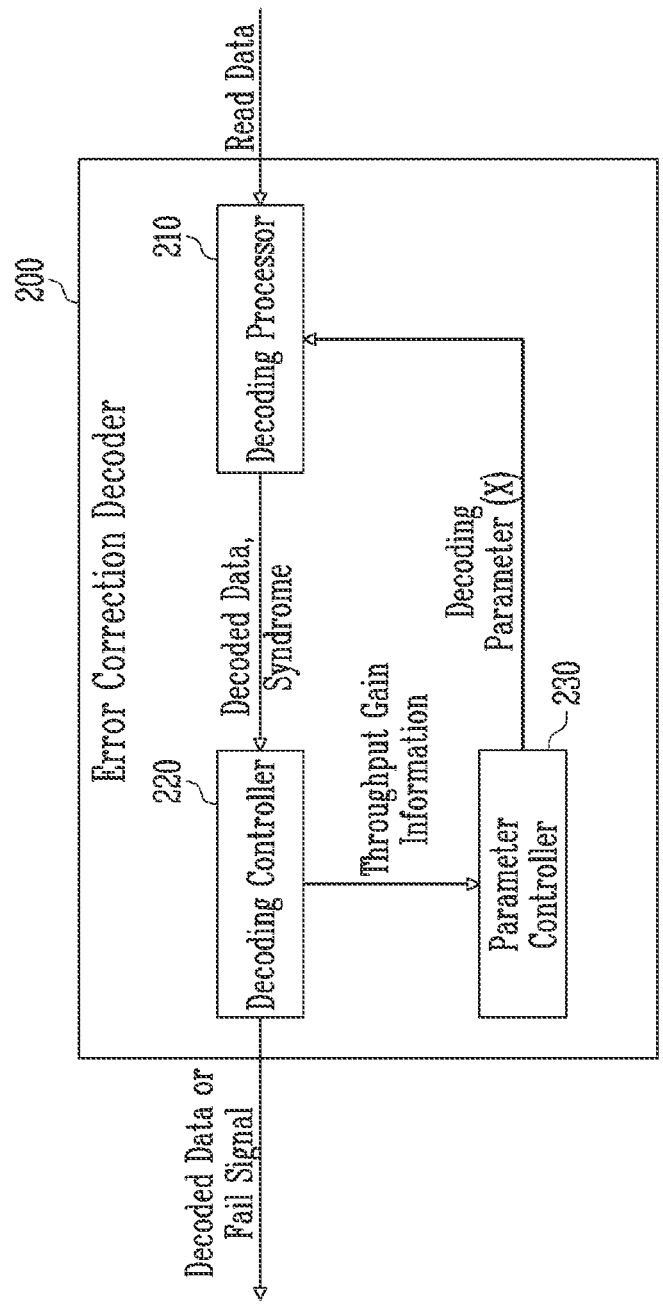
FIG. 2 is a diagram illustrating a structure of an error correction decoder shown in FIG. 1.

FIG. 2 is a diagram illustrating a structure of the error correction decoder shown in FIG. 1.

Referring to FIG. 2, the error correction decoder 200 may include a decoding processor 210, a decoding controller 220, and a parameter controller 230.

The decoding processor 210 may generate first decoded data by iterating error correction decoding on read data by a set number. When the iterating of the error correction decoding is not terminated, the decoding processor 210 may generate second decoded data by additionally iterating the error correction decoding on the first decoded data by a second set number. The decoding processor 210 may perform the error correction decoding based on at least one of a Bit-Flip (BF) algorithm and a Min-Sum (MS) algorithm.

In an embodiment, the error correction decoding is started from calculation of a syndrome. The syndrome is a binary vector which can be obtained from an Error Correction Code (ECC) chunk, and may include information on an error pattern to be corrected. A number of '1s' among entries included in the syndrome is in proportion to an error bit number remaining in the ECC chunk. A node which is not '0' among the entries included in the syndrome may be an Unsatisfied Check Node (UCN). Therefore, a number of UCNs may be an index for estimating which level error is to be currently corrected. A case where bit values estimated as errors in a chunk are reversed is iterated in error correction decoding using an LDPC code. Accordingly, the syndrome is also changed, and its value is continuously traced.

The decoding controller 220 may determine whether to terminate the iterating of the error correction decoding based on a result obtained by comparing a first threshold number with a number of UCNs included in a syndrome of the first decoded data. The syndrome of the first decoded data may be generated through vector calculation of a parity check matrix and the first decoded data. More specifically, the decoding controller 220 may trace a change in the syndrome in real time whenever error bit is corrected during the iteration of the error correction decoding. The decoding controller 220 may compare a threshold number with a number of UCNs included in the traced syndrome. When the number of UCNs included in the syndrome of the first decoded data is greater than the first threshold number, the decoding controller 220 may terminate the iterating of the error correction decoding. The decoding controller 220 may terminate the iterating of the error correction decoding and output a fail signal to the outside. When the number of UCNs included in the syndrome of the first decoded data is 0, the decoding controller 220 may determine the error correction decoding as pass, terminate the iterating of the error correction decoding, and output the first decoded data to the outside.

The decoding controller 220 may determine whether to terminate the iterating of the error correction decoding based on a result obtained by comparing a second threshold number with a number of UCNs included in a syndrome of the second decoded data. When the number of UCNs included in the syndrome of the second decoded data is greater than the second threshold number, the decoding controller 220 may terminate the iterating and output a fail signal to the outside. When the number of UCNs included in the syndrome of the second decoded data is 0, the decoding controller 220 may determine the error correction decoding as pass, terminate the iterating, and output the second decoded data to the outside.

The decoding controller 220 may provide throughput information of the error correction decoding to the parameter controller 230. The throughput information may include a throughput gain of error correction decoding using an early termination algorithm with a throughput of error correction decoding using no early termination algorithm.

The parameter controller 230 may set a decoding parameter, based on the throughput information. In an embodiment, the decoding parameter may include a first set number, a second set number, the first threshold number, and the second threshold number. A parameter table including the decoding parameter will be described in FIG. 8.

The parameter controller 230 may determine, based on the throughput information, a decoding parameter such that the decoding parameter maximizes the throughput gain of the error correction decoding using the early termination algorithm or minimize a throughput loss of the error correction decoding using the early termination algorithm. The determination of the decoding parameter will be described in FIG. 7.

In an embodiment, the decoding processor 210 may perform a first operation of generating decoded data by iterating error correction decoding on read data by a preset number. The decoding controller 220 may perform a second operation of determining whether to terminate the iterating of the error correction decoding based on a result obtained by comparing a threshold number with a number of UCNs included in a syndrome of the decoded data. When the number of UCNs included in the syndrome of the decoded data exceeds the threshold number, the decoding controller 220 may terminate the iterating and output a fail signal.

A decoding termination verification operation including the first operation and the second operation may be iterated at least twice. A set number and a threshold number in each decoding termination verification operation may be differently determined according to an iteration number of times the decoding termination verification operation. The parameter table described with reference to FIG. 8 may include a set number and a threshold number, which correspond to an iteration number of the decoding termination verification operation.

FIG. 3 is a diagram illustrating a syndrome in error correction decoding.

Referring to FIG. 3, a syndrome $S_i$ may be generated based on a parity check matrix H and a preposition $R_i^T$ of hard decision data $R_i$ corresponding to an ith iteration. First hard decision data $R_1$ may be data from the memory device.

Entries of the hard decision data $R_i$ represent hard decision values of variable nodes corresponding to the ith iteration. Each entry of the syndrome $S_i$ corresponds to a check node on a Tanner graph.

When all entries of the syndrome $S_i$ are '0,' i.e., when the number of UCNs is 0, this represents that a syndrome check passes in a corresponding iteration. When the syndrome check passes, the error correction decoding also passes. Therefore, the iterating of the error correction decoding is terminated, and the hard decision data $R_i$ corresponding to the ith iteration may be output as decoded data.

When at least one entry among all entries of the syndrome $S_i$ is not '0,' i.e., when the number of UCNs is not 0, this represents that the syndrome check fails in a corresponding iteration. This means that the error correction decoding has not succeeded in the corresponding iteration. Therefore, when the error correction decoding does not reach the maximum iteration number Imax, next error correction decoding may be iterated.

Figure 4:
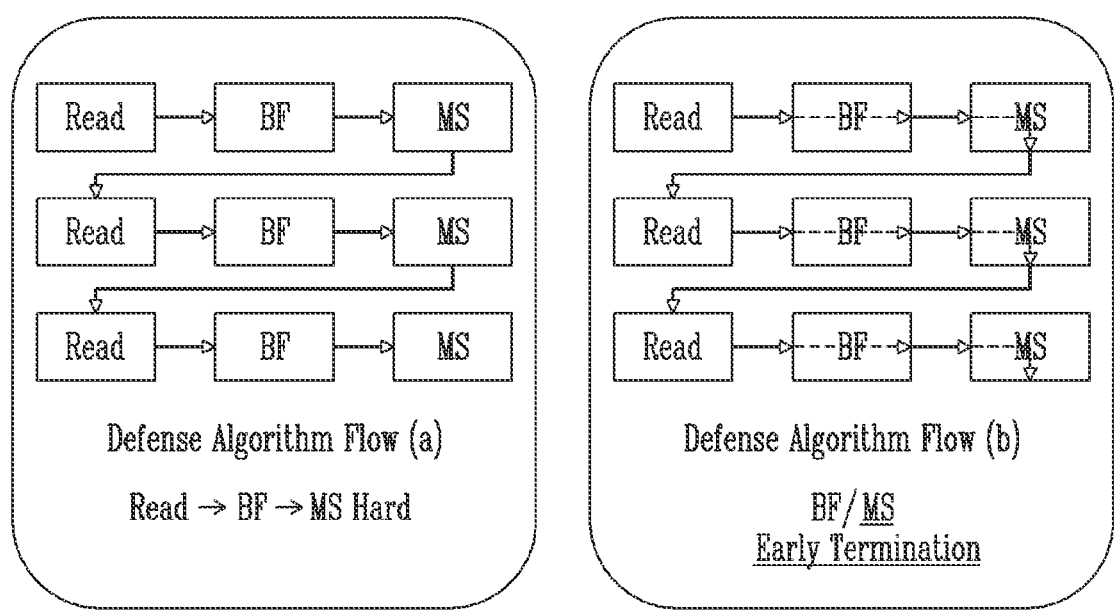
FIG. 4 is a diagram illustrating a defense algorithm flow in accordance with an embodiment of the present disclosure.

FIG. 4 is a diagram illustrating a defense algorithm flow in accordance with an embodiment of the present disclosure.

Referring to FIG. 4, in the case of defense algorithm flow (a), data may be read, and error correction decoding may be iterated based on the bit flipping algorithm. When the error correction decoding does not pass even after the error correction decoding is iterated up to a maximum iteration number, the bit flipping algorithm may be a low-complexity/low-performance/low-power algorithm, and the min-sum algorithm may be a high-complexity/high-performance/high-power algorithm.

When the error correction decoding does not pass even after the error correction decoding is iterated up to the maximum iteration number, based on the min-sum algorithm, the error correction decoding may be processed as fail. Data may be additionally read, and error correction decoding based on the bit flipping algorithm and error correction decoding based on the min-sum algorithm may be sequentially performed on the additionally read data. The above process may be iterated until the error correction decoding passes.

In the case of defense algorithm flow (b), like the defense algorithm flow (a), data may be read, and error correction decoding may be performed based on the bit flipping algorithm. When the error correction decoding does not pass, error correction decoding may be additionally performed based on the min-sum algorithm.

However, unlike the defense algorithm flow (a), in the defense algorithm flow (b), the error correction decoding is not performed up to the maximum iteration number but may be early terminated according to a current error level. Thus, an error is corrected using a minimum correction attempt and a minimum read number, and the reliability and performance of a memory can be ensured.

The defense algorithm flow (b) may be applied to the defense algorithm in accordance with an embodiment of the present disclosure.

Figure 5A:
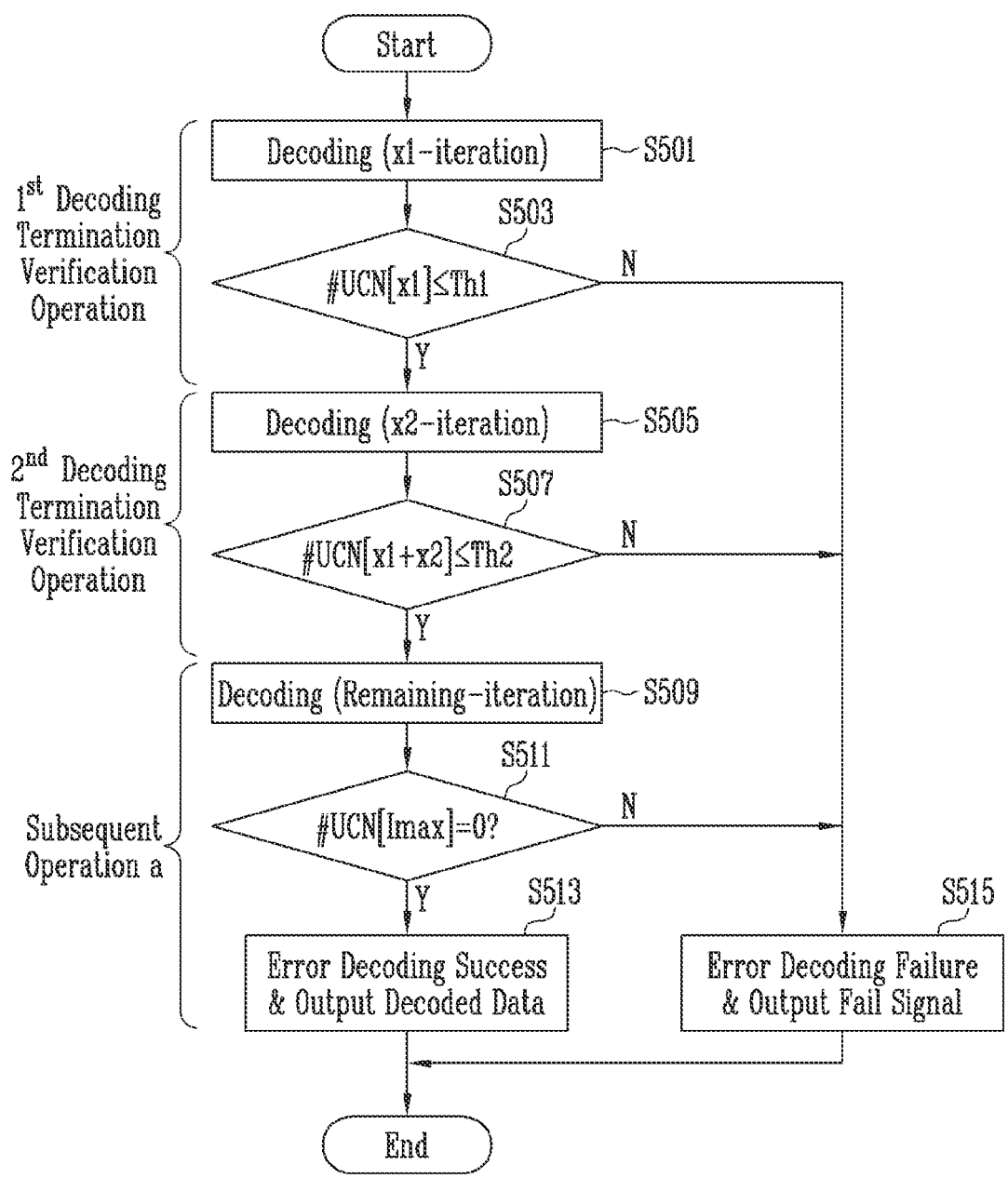
FIG. 5A is a flowchart illustrating an operating method of the error correction decoder in accordance with an embodiment of the present disclosure.

FIG. 5A is a flowchart illustrating an operating method of the error correction decoder in accordance with an embodiment of the present disclosure.

Referring to FIG. 5A, in operation S501, the error correction decoder may generate first decoded data by iterating error correction decoding on read data by a first set number x1.

In operation S503, the error correction decoder may decide whether a number of UCNs included in a syndrome of the first decoded data is within a threshold number Th1. The syndrome of the first decoded data may be acquired through vector calculation of the first decoded data and a parity check matrix. When the number of UCNs is within the first threshold number Th1, the error correction decoder proceeds to operation S505. When the number of UCNs is greater than the first threshold number Th1, the error correction decoder proceeds to operation S151.

In operation S505, the error correction decoder may generate second decoded data by iterating the error correction decoding on the first decoded data by a second set number x2.

In operation S507, the error correction decoder may determine whether a number of UCNs included in a syndrome of the second decoded data is within a second threshold number Th2. The syndrome of the decoded data may be acquired through vector calculation of the second decoded data and a parity check matrix. When the number of UCNs is within the second threshold number Th2, the error correction decoder proceeds to operation S509. When the number of UCNs is greater than the second threshold number Th2, the error correction decoder proceeds to operation S515.

In operation S509, the error correction decoder may iterate the error correction decoding on the second decoded data by a remaining number up to a maximum iteration number Imax.

In operation S511, the error correction decoder may determine whether a number of UCNs included in a syndrome of decoded data acquired through iteration of the error correction decoding is 0. When the number of UCNs is 0, the error correction decoder proceeds to operation S513. When the number of UCNs is not 0, the error correction decoder proceeds to operation S515.

In operation S513, the error correction decoder may determine the error correction decoding as pass, and output decoded data to the outside.

In operation S515, the error correction decoder may determine the error correction decoding as fail, and terminate the iterating by outputting a fail signal. When the error correction decoding is determined as fail, a read operation on data may be additionally performed for the purpose of data recovery.

In accordance with an embodiment, although a case where it is verified whether the number of UCNs is 0 is illustrated in operations S503, S507, and S509, an operation of verifying whether the number of UCNs is 0 may be performed whenever the error correction decoding is iterated in each of the operations S503, S507, and S509. Therefore, when it is determined that the number of UCNs is 0 even in the middle of the error correction decoding, the error correction decoder may proceed to operation S513.

In FIG. 5A, a first decoding termination verification operation may include the operations S501 and S503. A second decoding termination verification operation may include the operations S505 and S507. In accordance with an embodiment of the present disclosure, the error correction decoder may perform a decoding termination verification operation at least twice.

That is, the decoding termination verification operation has been iterated twice in the example shown in FIG. 5A. However, the present disclosure is not limited thereto, and the decoding termination verification operation may be iterated three times or more.

Subsequent operation a may be performed after the first and second decoding termination verification operations are performed. The subsequent operation a may include the operations S509, S511, S513, and S515. The subsequent operation a may be performed without the decoding termination verification operation.

A set number and a threshold number, which correspond to each decoding termination verification operation, may be set according to an order in which the decoding termination verification operation is performed.

For example, a first set number x1 corresponding to the first decoding termination verification operation and a second set number x2 corresponding to the second decoding termination verification operation may be set equal to each other or be set different from each other. A first threshold number Th1 corresponding to the first decoding termination verification operation and a second threshold number Th2 corresponding to the second decoding termination verification operation may be set equal to each other or be set different from each other.

Figure 5B:
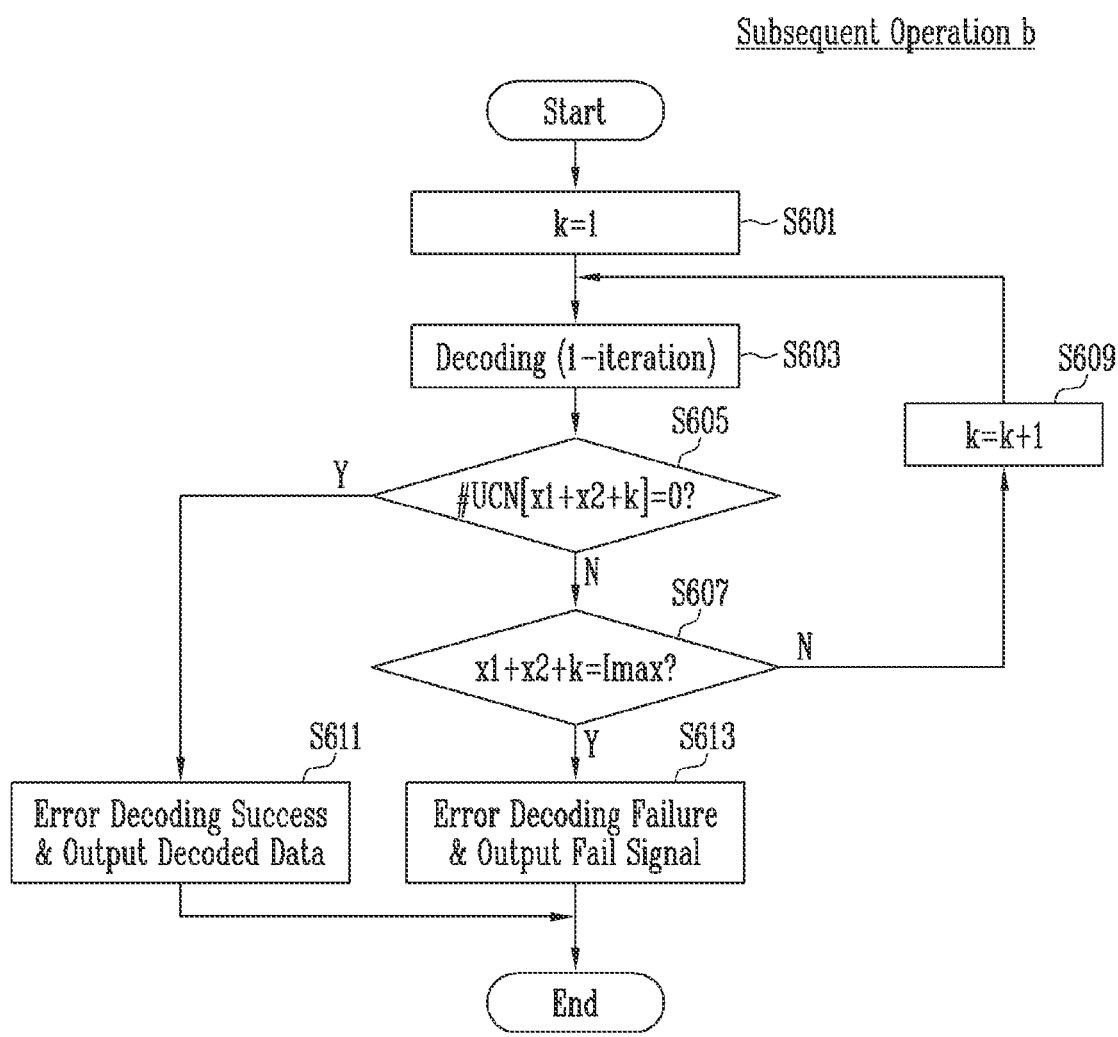
FIG. 5B is a flowchart illustrating another embodiment of a subsequent operation described in FIG. 5A.

FIG. 5B is a flowchart illustrating another embodiment of the subsequent operation described in FIG. 5A.

Referring to FIG. 5B, subsequent operation b may be another embodiment of the subsequent operation a. The subsequent operation b may be performed after the operation S507 described in FIG. 5A. The subsequent operation b may include operations S601 to S613.

In operation S601, the error correction decoder may set a value of k to 1.

In operation S603, the error correction decoder may perform error correction decoding on second decoded data once.

In operation S605, the error correction decoder may determine whether a number of UCNs included in a syndrome of decoded data acquired through the error correction decoding is 0. When the number of UCNs is 0, the error correction decoder proceeds to operation S611. When the number of UCNs is not 0, the error correction decoder proceeds to operation S607.

In operation S607, the error correction decoder may determine whether a value obtained by adding up a first set number x1, a second set number x2 and k is a maximum iteration number Imax. As a decision result, when the value is the maximum iteration number Imax, the error correction decoder proceeds to operation S613. As a decision result, when the value is less than the maximum iteration number Imax, the error correction decoder proceeds to operation S609.

In operation S609, the error correction decoder may increase the value of k by 1.

In operation S611, the error correction decoder may determine the error correction decoding as pass, and output decoded data to the outside.

In operation S613, the error correction decoder may determine the error correction decoding as fail, and terminate the iterating by outputting a fail signal. When the error correction decoding is determined as fail, a read operation on data may be additionally performed for the purpose of data recovery.

Unlike the subsequent operation a described with reference to FIG. 5A, in the subsequent operation b, although the error correction decoding is not iterated up to the maximum iteration number Imax, the error correction decoder may determine the error correction decoding as pass when the number of UCNs is 0 as a result of the error correction decoding in the middle, and terminate the iterating.

FIG. 6 is a diagram illustrating a time required according to a success/fail case of the error correction decoding in FIG. 5A.

Referring to FIG. 6, when the error correction decoding fails, a read operation is additionally performed and next error correction decoding certainly passes. When the error correction decoding succeeds, an average iteration (Iavg) performance time of a corresponding error environment is required.

S1 represents a case in which it is expected that the error correction decoding will succeed when the error correction decoding is not early terminated but performed in operation S503. S2 represents a case in which it is expected that the error correction decoding will succeed when the error correction decoding is not early terminated but performed in operation S507. S3 represents a case in which it is expected that the error correction decoding will succeed in operation S509.

F1 represents a case in which it is expected that the error correction decoding will fail when the error correction decoding is not early terminated but performed in operation S503. F2 represents a case in which it is expected that the error correction decoding will fail when the error correction decoding is not early terminated but performed in operation S507. F3 represent a case in which it is expected that the error correction decoding will fail in operation S509.

S1 and S2 are a case where, since the error correction decoding is early terminated by the decoding termination verification operation in accordance with the embodiment of the present disclosure even though it is expected that the error correction decoding will succeed, this corresponds to a false alarm, and performance is deteriorated.

S3 is a case where, since the error correction decoding is not early terminated by the decoding termination verification operation, this is not influenced by performance.

F1 and F2 are a case where, since the error correction decoding is early terminated by the decoding termination verification operation in accordance with the embodiment of the present disclosure even though it is expected that the error correction decoding will fail, unnecessary iteration of the error correction decoding is reduced, and performance is improved.

F3 is a case where an algorithm of an embodiment is not operated as it is intended, since the error correction decoding is not early terminated by the decoding termination verification operation in accordance with the embodiment even though it is expected that the error correction decoding will fail.

FIG. 7 is a diagram illustrating an expression for determining an optimization parameter in accordance with an embodiment of the present disclosure.

Referring to FIG. 7, X is a symbol for briefly representing a decoding parameter (x1, x2, Th1, and Th2) of an early termination algorithm to be optimized. In FIG. 7, the decoding parameter X may include a first set number x1, a second set number x2, a first threshold number Th1, and a second threshold number Th2.

$T^G_{Ci}(X)$ is a throughput gain of the error correction decoding with respect to an existing throughput (i.e., a throughput of the error correction decoding when the early termination algorithm is not used), when the early termination algorithm is applied to data of a fixed ith error environment $ci$ by using the parameter X.

In a first optimization algorithm, when an algorithm proposed in each error environment is applied together with the fixed X, $X_{opt1}$ is searched, in which a throughput gain loss sum is minimized with respect to the use of $X_{ci}$ which is optimum in each error environment.

In a second optimization algorithm, when an algorithm proposed in each error environment is applied together with the fixed X, $X_{opt2}$ is searched, in which an average throughput gain in each error environment is maximized.

Since the optimization algorithm uses a throughput as an objective function, the objective function has unimodality with respect to a first threshold number Th1 and a second threshold number Th2, and simple Fibonacci search is applicable. Thus, precise optimization can be performed at high speed. Such an efficient error correction decoding early termination and optimization method can be applied to error correction decoding based on another algorithm in addition to the min-sum algorithm.

FIG. 8 is a diagram illustrating a parameter table in accordance with an embodiment of the present disclosure.

Referring to FIG. 8, the parameter table may include a set number x and a threshold number Th, which correspond to the Decoding Termination Verification Operation (DTVO) described with reference to FIG. 5A.

The set number x and the threshold number Th may be variously set according to an order in which the DTVO is performed. In FIG. 8, it is described that the number of times the DTVO is performed is n times. The set number x and the threshold number Th may be variously set according to an order in which each DTVO is performed.

In FIG. 5A, since the first and second decoding termination verification operations have been performed, the parameter table may include a first set number x1 and a first threshold number Th1, which correspond to the first decoding termination verification operation, and a second set number x2 and a second threshold number Th2, which correspond to the second decoding termination verification operation.

Figure 9:
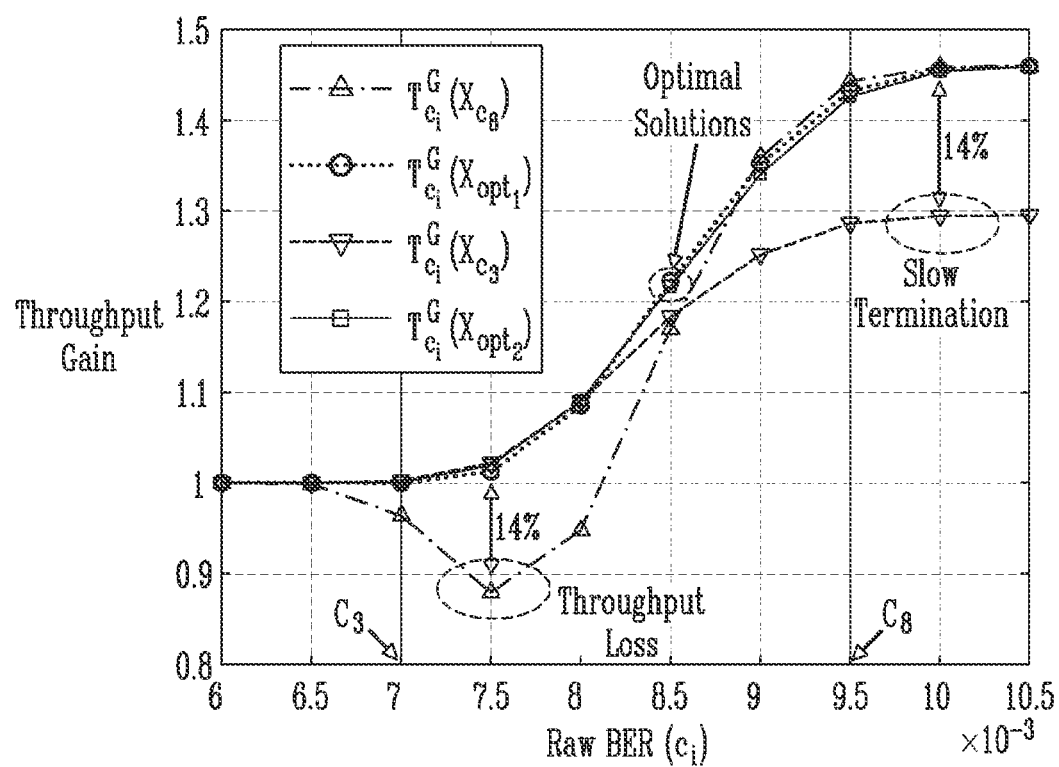
FIG. 9 is a diagram illustrating a throughput gain for each parameter in accordance with an embodiment of the present disclosure.

FIG. 9 is a diagram illustrating a throughput gain for each parameter in accordance with an embodiment of the present disclosure.

Referring to FIG. 9, $X_{c3}$ may be a parameter optimized with respect to data of a third error environment c3. $X_{c8}$ may be a parameter optimized with respect to data of an eighth error environment c8.

The throughput gain for each parameter will be described. It can be seen that the parameter $X_{c8}$ optimized in an environment (c8) in which raw BER is high exhibits a throughput loss due to a false alarm in an environment in which the raw BER is relatively low. On the contrary, it can be seen that the parameter $X_{c3}$ optimized in an environment (c3) in which the raw BER is low exhibits throughput low due to a false alarm in an environment in which the raw BER is relatively high.

It can be seen that, when balanced optimization is performed, such as the optimization parameters $X_{opt1}$ and $X_{opt2}$, which are described with reference to FIG. 7, excellent performance is exhibited in all error environments.

Figure 10:
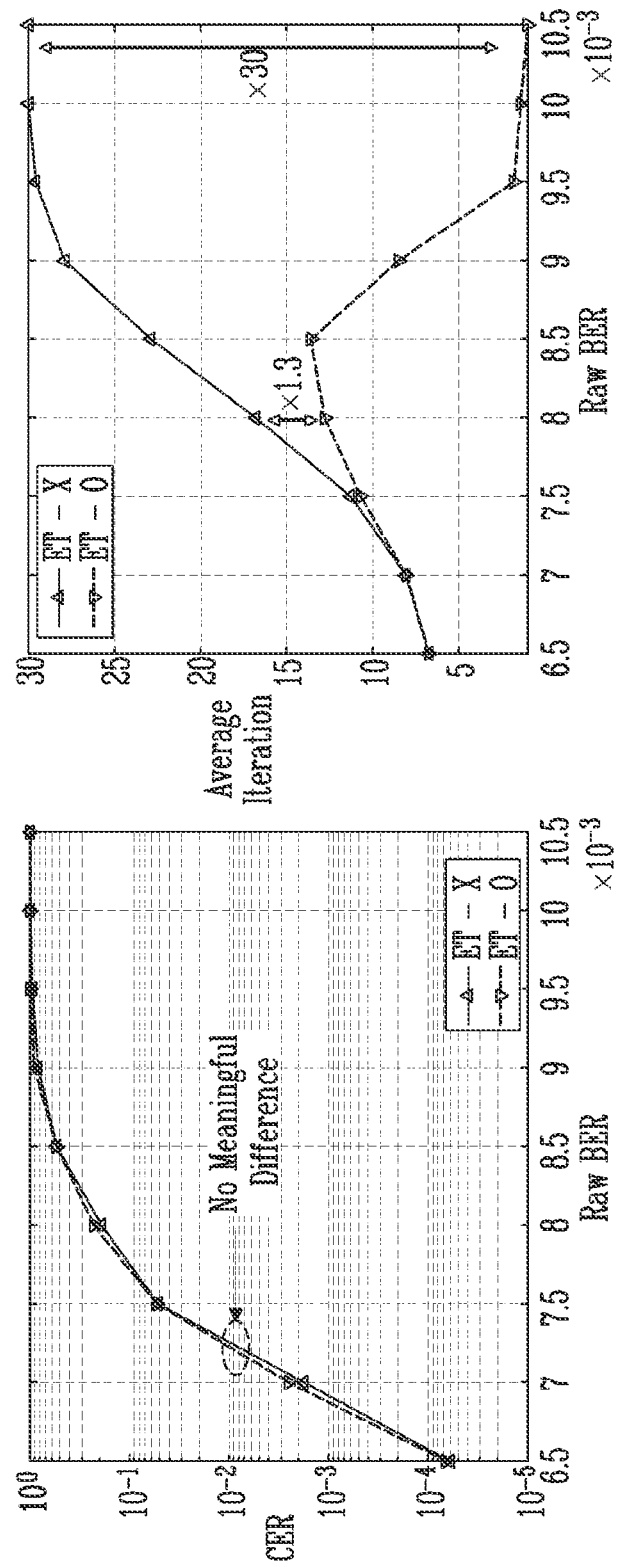
FIG. 10 is a diagram illustrating error correction decoding performance in accordance with an embodiment of the present disclosure.

FIG. 10 is a diagram illustrating error correction decoding performance in accordance with an embodiment of the present disclosure.

Referring to FIG. 10, any performance difference is hardly exhibited in error correction decoding to which an Early Termination (ET) algorithm is applied and error correction decoding to which the ET algorithm is not applied, but a large difference is exhibited in an iteration number of the error correction decoding to which the ET algorithm is applied and the error correction decoding to which the ET algorithm is not applied. That is, in accordance with the embodiment of the present disclosure, error correction performance is not influenced, and unnecessary iteration of the error correction decoding can be reduced through early termination.

Figure 11:
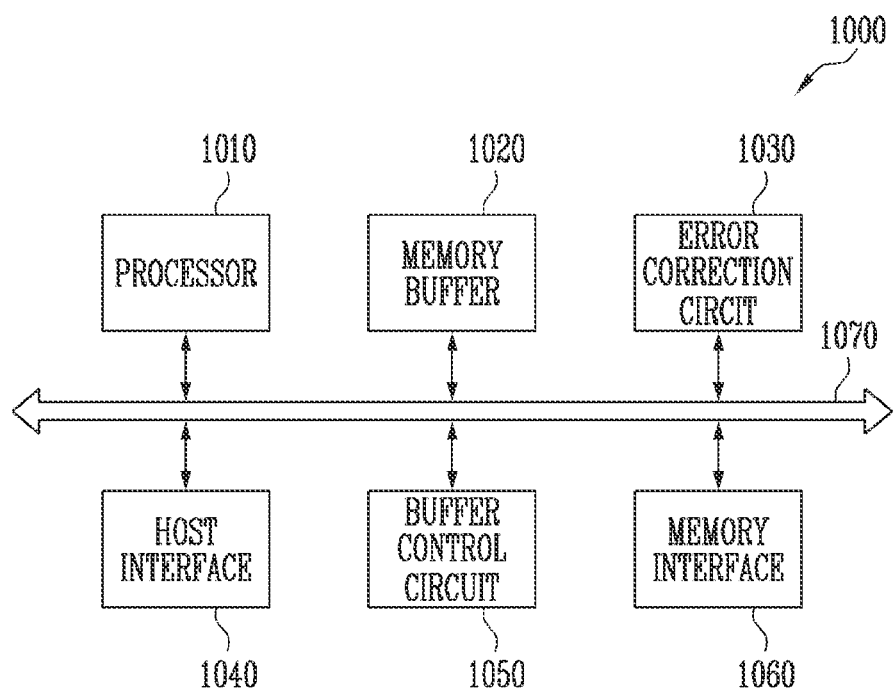
FIG. 11 is a diagram illustrating a memory controller including the error correction circuit shown in FIG. 1.

FIG. 11 is a diagram illustrating a memory controller 1000 including the error correction circuit shown in FIG. 1.

Referring to FIG. 11, the memory controller 1000 is connected to a host and a memory device. The memory controller 1000 may access the memory device in response to a request received from the host. For example, the memory controller 1000 may control write, read, erase, and background operations of the memory device. The memory controller 1000 may provide an interface between the memory device and the host. The memory controller 1000 may drive firmware for controlling the memory device.

The memory controller 1000 may include a processor 1010, a memory buffer 1020, an error correction circuit 1030, a host interface 1040, a buffer control circuit 1050, a memory interface 1060, and a bus 1070.

The bus 1070 may be configured to provide channels between components of the memory controller 1000.

The processor 1010 may control a general operation of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of a storage device, using the memory buffer 1020 as a working memory, a cache memory or a buffer memory.

The processor 1010 may perform a function of a flash translation layer (FTL). The processor 1010 may translate a logical block address (LBA) provided by the host through the FTL into a physical block address (PBA). The FTL may receive an LBA, using a mapping table, to translate the LBA into a PBA. Several address mapping methods of the FTL exist according to mapping units.

The processor 1010 may randomize data received from the host. For example, the processor 1010 may randomize data received from the host, using a randomizing seed. The randomized data is provided as data to be stored to the memory device to be programmed in a memory cell array.

In a read operation, the processor 1010 may derandomize data received from the memory device. For example, the processor 1010 may derandomize data received from the memory device, using a derandomizing seed. The derandomized data may be output to the host.

In an embodiment, the processor 1010 may perform randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may include a Static RAM (SRAM) or a Dynamic RAM (DRAM).

The error correction circuit 1030 may include the error correction circuit described with reference to FIG. 1. The error correction circuit 1030 may perform error correction. The error correction circuit 1030 may perform Error Correction Code (ECC) encoding on data to be written in the memory device through the memory interface 1060. The ECC encoded data may be transferred to the memory device through the memory interface 1060. The error correction circuit 1030 may perform ECC decoding on data received from the memory device through the memory interface 1060.

The host interface 1040 may communicate with the external host under the control of the processor 1010. The host interface 1040 may communicate with the host, using at least one of various communication standards or interfaces, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a NonVolatile Memory Express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

The memory controller 1000 may not include the memory buffer 1020 and the buffer control circuit 1050.

The processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

The bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, and may not interfere or influence with each other. The data bus may be connected to the host interface 1040, the buffer control circuit 1050, the error correction circuit 1030, and the memory interface 1060. The control bus may be connected to the host interface 1040, the processor 1010, the buffer control circuit 1050, the memory buffer 1020, and the memory interface 1060.

Figure 12:
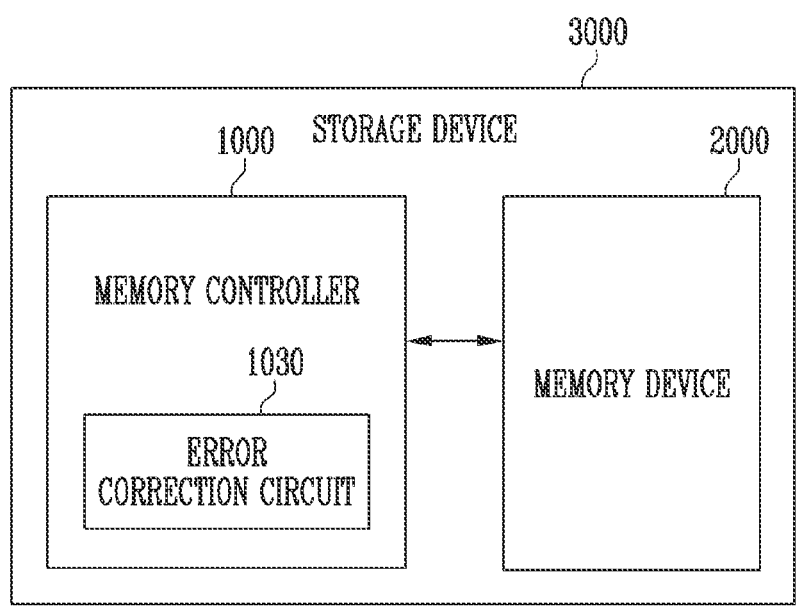
FIG. 12 is a diagram illustrating a storage device including the memory controller shown in FIG. 11.

FIG. 12 is a diagram illustrating a storage device 3000 including the memory controller 1000 shown in FIG. 11.

Referring to FIG. 12, the storage device 3000 may include a memory device 2000 and the memory controller 1000 for controlling an operation of the memory device 2000. The storage device 3000 is a device for storing data under the control of a host such as a mobile phone, a smartphone, an MP3 player, a laptop computer, a desktop computer, a game console, a TV, a tablet PC, or an in-vehicle infotainment system.

The storage device 3000 may be manufactured as any of various types of storage devices according to a host interface as a communication scheme with the host. For example, the storage device 3000 may be configured as any of a variety of types of storage devices, such as a Solid State Drive (SSD), a multimedia card in the form of an MMC, an eMMC, an RS-MMC and a micro-MMC, a secure digital card in the form of an SD, a mini-SD and a micro-SD, a Universal Serial Bus (USB) storage device, a Universal Flash Storage (UFS) device, a personal computer memory card international association (PCMCIA) card type storage device, a peripheral component interconnection (PCI) card type storage device, a PCI express (PCI-e or PCIe) card type storage device, a Compact Flash (CF) card, a Smart Media Card (SMC), and a memory stick.

The storage device 3000 may be manufactured as any of various package types. For example, the storage device 3000 may be manufactured as any of various package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 2000 may store data. The memory device 2000 is operated under the control of the memory controller 1000. The memory device 2000 may include a memory cell array including a plurality of memory cells for storing data.

The memory cell array may include a plurality of memory blocks. Each memory block may include a plurality of memory cells. One memory block may include a plurality of pages. In an embodiment, the page may be unit for programming data to the memory device 2000 or reading data stored in the memory device 2000.

The memory block may be a unit for erasing data. In an embodiment, the memory device 2000 may be a Double Data Rate Synchronous Dynamic Random Access Memory (DDR SDRAM), a Low Power Double Data Rate4 (LPDDR4) SDRAM, a Graphics Double Data Rate (GDDR) SDRAM, a Low Power DDR (LPDDR), a Rambus Dynamic Random Access Memory (RDRAM), a NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 2000 is a NAND flash memory is described.

The memory device 2000 is configured to receive a command and an address from the memory controller 1000 and to access an area selected by the address in the memory cell array. That is, the memory device 2000 may perform an operation corresponding to the command on the area selected by the address. For example, the memory device 2000 may perform a write operation (program operation), a read operation, and an erase operation. In the program operation, the memory device 2000 may program data in the area selected by the address. In the read operation, the memory device 2000 may read data from the area selected by the address. In the erase operation, the memory device 2000 may erase data stored in the area selected by the address.

The memory controller 1000 may control overall operations of the memory device 2000.

When power is applied to the storage device 3000, the memory controller 1000 may execute firmware (FW). When the memory device 2000 is a flash memory device, the memory controller 1000 may execute FW such as a Flash Translation Layer (FTL) for controlling communication between the host and the memory device 2000.

In an embodiment, the memory controller 1000 may receive data and a Logical Block Address (LBA) from the host, and translate the LBA into a Physical Block Address (PBA) representing an address of memory cells included in the memory device 2000, in which data is to be stored.

The memory controller 1000 may control the memory device 2000 to perform a program operation, a read operation, an erase operation, or the like in response to a request from the host. In the program operation, the memory controller 1000 may provide a program command, a PBA, and data to the memory device 2000. In the read operation, the memory controller 1000 may provide a read command and a PBA to the memory device 2000. In the erase operation, the memory controller 1000 may provide an erase command and a PBA to the memory device 2000.

In an embodiment, the memory controller 1000 may autonomously generate a command, an address, and data regardless of any request from the host, and transmit the command, the address, and the data to the memory device 2000. For example, the memory controller 1000 may provide the memory device 2000 with a command, an address, and data, which are used to perform background operations such as a program operation for wear leveling and a program operation for garbage collection.

In an embodiment, the memory controller 1000 may include an error correction circuit 1030. The error correction circuit 1030 may include the error correction circuit described with reference to FIG. 1.

The memory controller 1000 may iterate error correction decoding on data read from the memory device 2000. While the error correction decoding is iterated, the memory controller 1000 may determine whether to continue iterating the error correction decoding based on a result obtained by comparing a first threshold number with a number of Unsatisfied Check Nodes (UCNs) included in a syndrome of first decoded data, which is a result of a first set number of the iterations of the error correction decoding.

For example, when the number of UCNs included in the syndrome of the first decoded data exceeds the first threshold number, the memory controller 1000 may terminate the iterating and determine the error correction decoding as fail. When the number of UCNs included in the syndrome of the first decoded data is greater than 0 and is less than or equal to the first threshold number, the memory controller 1000 may continue iterating the error correction decoding. When the number of UCNs included in the syndrome of the first decoded data is 0, the memory controller 1000 may terminate the iterating and determine the error correction decoding as pass.

In an embodiment, after the memory controller 1000 iterates the error correction decoding by the first set number, the memory controller 1000 may additionally iterate the error correction decoding. When a number of UCNs included in decoded data is 0 while the error correction decoding is additionally iterated, the memory controller 1000 may terminate the iterating and determine the error correction decoding as pass.

The memory controller 1000 may determine whether to continue iterating the error correction decoding based on a result obtained by comparing a second threshold number with a number of UCNs included in a syndrome of second decoded data, which is a result of a sum of the first set number and a second set number of the iterations of the error correction decoding.

For example, when the number of UCNs included in the syndrome of the second decoded data exceeds the second threshold number, the memory controller 1000 may terminate the iterating and determine the error correction decoding as fail. When the number of UCNs included in the syndrome of the second decoded data is greater than 0 and is less than or equal to the second threshold number, the memory controller 1000 may continue iterating the error correction decoding. When the number of UCNs included in the syndrome of the second decoded data is 0, the memory controller may terminate the iterating and determine the error correction decoding as pass.

After the memory controller 100 iterates the error correction decoding by the sum of the first set number and the second set number, the memory controller 1000 may additionally iteratively iterate the error correction decoding. When a number of UCNs included in decoded data is 0 while the error correction decoding is additionally iterated, the memory controller 1000 may terminate the iterating and determine the error correction decoding as pass. When a number of UCNs included in decoded data, which is a result of the maximum iteration number of the iterations of the error correction decoding, is not 0, the memory controller 1000 may terminate the iterating and determine the error correction decoding as fail.

The host may communicate with the storage device 3000, using at least one of various communication standards or interfaces, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a NonVolatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

In accordance with the present disclosure, there is provided an error correction decoder performing error correction, a storage device including an error correction decoder, and an operating method thereof.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or part of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Moreover, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A storage device comprising:
a memory device configured to store data; and
a memory controller configured to:
iterate error correction decoding on data read from the memory device,
determine whether to continue iterating based on a result obtained by comparing a first threshold number with a number of Unsatisfied Check Nodes (UCNs) included in a syndrome of first decoded data, which is a result of a first set number of iterations of the error correction decoding on the read data, and
determine whether to continue iterating based on a result obtained by comparing a second threshold number with a number of UCNs included in a syndrome of second decoded data, which is a result of a sum of the first set number and a second set number of iterations of the error correction decoding on the read data.

2. An error correction decoder comprising:
a decoding processor configured to:
generate first decoded data by iterating error correction decoding on read data by a first set number, and
generate second decoded data by additionally iterating the error correction decoding on the first decoded data by a second set number; and
a decoding controller configured to determine whether to continue iterating based on at least one of first and second results,
wherein the first result is obtained by comparing a first threshold number with a number of Unsatisfied Check Nodes (UCNs) included in a syndrome of the first decoded data, and
wherein the second result is obtained by comparing a second threshold number with a number of UCNs included in a syndrome of the second decoded data.

3. The error correction decoder of claim 2, further comprising a parameter controller configured to set the first set number, the second set number, the first threshold number, and the second threshold number.

4. The error correction decoder of claim 3, wherein the parameter controller is further configured to determine each of the first and second set numbers and the first and second threshold numbers such that combination of the determined numbers maximizes a throughput gain of the error correction decoding.

5. The error correction decoder of claim 3, wherein the parameter controller is further configured to determine each of the first and second set numbers and the first and second threshold numbers such that a combination of the determined numbers minimizes a throughput loss of the error correction decoding.

6. The error correction decoder of claim 2, wherein the decoding controller determines not to continue iterating when the number of UCNs included in the syndrome of the first decoded data is greater than the first threshold number or when the number of UCNs included in the syndrome of the second decoded data is greater than the second threshold number.

7. The error correction decoder of claim 2, wherein, when the number of UCNs included in the syndrome of the first decoded data is zero (0) or when the number of UCNs included in the syndrome of the second decoded data is zero (0), the decoding controller determines not to continue iterating and is further configured to determine the error correction decoding as pass.

8. The error correction decoder of claim 2, wherein the decoding processor performs the error correction decoding according to at least one of a Bit-Flip (BF) algorithm and a Min-Sum (MS) algorithm.

9. An error correction decoder comprising:
- a decoding processor configured to perform a first operation of generating decoded data by iterating error correction decoding on read data by a set number; and
- a decoding controller configured to perform a second operation of determining whether to terminate the iterating of the error correction decoding based on a result obtained by comparing a threshold number with a number of Unsatisfied Check Nodes (UCNs) included in a syndrome of the decoded data,
- wherein the decoding processor and the decoding controller iterate a set of the first and second operations, as a decoding termination verification operation, at least twice, and
- wherein each of the set number and the threshold number is set according to a number of iterations of the decoding termination verification operation.

10. The error correction decoder of claim 9, further comprising a parameter controller configured to store the set number and the threshold number, which correspond to the number of iterations of the decoding termination verification operation.

11. The error correction decoder of claim 10, wherein the decoding controller provides the parameter controller with throughput information on the error correction decoding.

12. The error correction decoder of claim 11, wherein the parameter controller is further configured to determine, based on the throughput information, each of the set number and the threshold number such that a combination of the determined numbers maximizes a throughput gain of the error correction decoding or minimizes a throughput loss of the error correction decoding.

13. The error correction decoder of claim 9, wherein the decoding processor performs the error correction decoding according to at least one of a Bit-Flip (BF) algorithm and a Min-Sum (MS) algorithm.

* * * * *